(12) United States Patent
Chin

(10) Patent No.: US 9,668,131 B2
(45) Date of Patent: May 30, 2017

(54) MOBILE DEVICE AND WIRELESS PAIRING METHOD

(71) Applicant: HTC Corporation, Taoyuan County (TW)

(72) Inventor: Sung-Ming Chin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 69 days.

(21) Appl. No.: 14/162,780

(22) Filed: Jan. 24, 2014

(65) Prior Publication Data

US 2015/0215778 A1    Jul. 30, 2015

(51) Int. Cl.
*H04W 12/06* (2009.01)
*H04W 8/00* (2009.01)

(52) U.S. Cl.
CPC .......... *H04W 12/06* (2013.01); *H04W 8/005* (2013.01)

(58) Field of Classification Search
CPC ...... H04W 12/06; H04W 12/08; H04W 76/02
USPC ................................................ 455/411, 41.1
See application file for complete search history.

(56) References Cited

U.S. PATENT DOCUMENTS

| 6,404,866 | B1 * | 6/2002 | Hopper et al. ........... 379/114.15 |
| 8,116,685 | B2 * | 2/2012 | Bregman-Amitai et al. ............................ 455/41.2 |
| 8,249,504 | B2 * | 8/2012 | Fujii ............................ 455/41.2 |
| 8,270,944 | B1 * | 9/2012 | Gailloux et al. .............. 455/406 |
| 8,424,067 | B2 * | 4/2013 | Keohane et al. ................. 726/6 |
| 8,879,994 | B2 * | 11/2014 | Brown et al. ................. 455/41.3 |
| 2010/0227549 | A1 * | 9/2010 | Kozlay ........................ 455/26.1 |
| 2013/0109307 | A1 * | 5/2013 | Reisgies et al. ............. 455/41.1 |
| 2013/0134212 | A1 | 5/2013 | Chang |
| 2014/0279479 | A1 * | 9/2014 | Maniar .................. G06Q 20/36 705/41 |
| 2014/0335818 | A1 * | 11/2014 | Jain .............................. 455/406 |

OTHER PUBLICATIONS

Keshav, K; Indukuri, V; "Energy efficient scheduling in 4G smart phones for mobile hotspot application": 2012 National Conference on Communications (IEEE) ISBN: 978-1-4673-0815-1.*

* cited by examiner

*Primary Examiner* — Vladimir Magloire
*Assistant Examiner* — Donald H Braswell
(74) *Attorney, Agent, or Firm* — Jianq Chyun IP Office

(57) ABSTRACT

A mobile device and a corresponding wireless pairing method are provided. The mobile device includes a storage device, a display, and a processor. The storage device stores at least one password. Each password is associated with an access period or an access count. The processor is coupled to the storage device and the display. The processor deletes a password when the access period or the access count associated with the password expires. The processor encodes a password in an image and controls the display to display the image. The processor receives a pairing request including a password from another mobile device. The processor accepts the pairing request when the password of the pairing request matches any password stored in the storage device. The processor rejects the pairing request when the password of the pairing request does not match any password stored in the storage device.

10 Claims, 3 Drawing Sheets

MOBILE DEVICE AND WIRELESS PAIRING METHOD

BACKGROUND OF THE INVENTION

Field of the Invention

The present invention relates to a wireless pairing method. More particularly, the present invention relates to a wireless pairing method for mobile devices.

Description of the Related Art

Some modern mobile devices can provide the functions of a mobile access point (AP). A mobile device without the capability to access a wireless network directly may pair with such a mobile AP to access the wireless network through the mobile AP.

When a mobile device need to pair with a mobile AP, the user of the mobile device has to input a password and a service set identifier (SSID) to the mobile device. Typically, the user of the mobile AP has to tell the user of the mobile device about the password and the SSID, or control the mobile AP to display the password and the SSID, so that the user of the mobile device can input the password and the SSID, which is troublesome because the process involves with a lot of operations.

SUMMARY OF THE INVENTION

Accordingly, the present invention is directed to a mobile device and a wireless pairing method that provide an easy and efficient way to set up wireless pairing.

According to an embodiment of the present invention, a first mobile device is provided, which includes a storage device, a display, and a processor. The storage device stores at least one password. Each password is associated with an access period or an access count. The processor is coupled to the storage device and the display. The processor deletes a password when the access period or the access count associated with the password expires. The processor encodes a password in an image and controls the display to display the image. The processor receives a pairing request including a password from a second mobile device. The processor accepts the pairing request when the password of the pairing request matches any password stored in the storage device. The processor rejects the pairing request when the password of the pairing request does not match any password stored in the storage device.

According to another embodiment of the present invention, a first mobile device is provided, which includes an image sensor and a processor coupled to the image sensor. The processor controls the image sensor to take an image displayed by a second mobile device. The processor decodes the image to obtain a password and at least one type of wireless communication that is available in the second mobile device. The processor sends a pairing request including the password to the second mobile device through one of the least one type of wireless communication.

According to another embodiment of the present invention, a wireless pairing method is provided. The wireless pairing method is executed by a first mobile device and includes the following steps: storing at least one password in the first mobile device, wherein each password is associated with an access period or an access count; deleting a said password when the access period or the access count associated with the password expires; encoding a password in an image and displaying the image; receiving a pairing request including a password from a second mobile device; accepting the pairing request when the password of the pairing request matches any password stored in the first mobile device; and rejecting the pairing request when the password of the pairing request does not match any password stored in the first mobile device.

According to another embodiment of the present invention, a wireless pairing method is provided. The wireless pairing method is executed by a first mobile device and includes the following steps: taking an image displayed by a second mobile device; decoding the image to obtain a password and at least one type of wireless communication that is available in the second mobile device; and sending a pairing request including the password to the second mobile device through one of the least one type of wireless communication.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
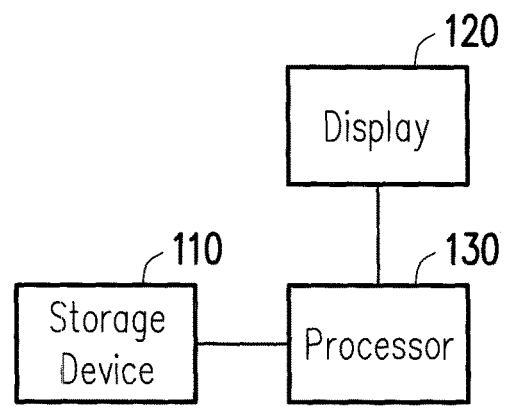
FIG. 1 and FIG. 2 are schematic diagrams showing two mobile devices according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a mobile device 100 according to an embodiment of the present invention. The mobile device 100 may be a smart phone, a personal digital assistant (PDA), a tablet computer, a notebook computer, or an electronic accessory of another mobile device. The mobile device 100 includes a storage device 110, a display 120, and a processor 130. The processor 130 is coupled to the storage device 110 and the display 120. The storage device 110 stores one or more passwords. Each password is associated with an access period or an access count. The processor 130 may control the display 120 to display various images. In addition, the processor 130 may execute the method shown in FIG. 3.

Figure 2:
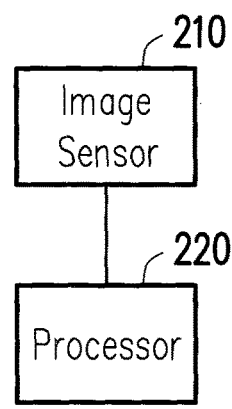

FIG. 2 is a schematic diagram showing another mobile device 200 according to an embodiment of the present invention. The mobile device 200 may be a smart phone, a PDA, a tablet computer, a notebook computer, or an electronic accessory of another mobile device. The mobile device 200 includes an image sensor 210 and a processor 220 coupled to the image sensor 210. The image sensor 210 may be a camera or any other electronic device capable of taking digital images. The processor 220 may execute the method shown in FIG. 4.

Figure 3:
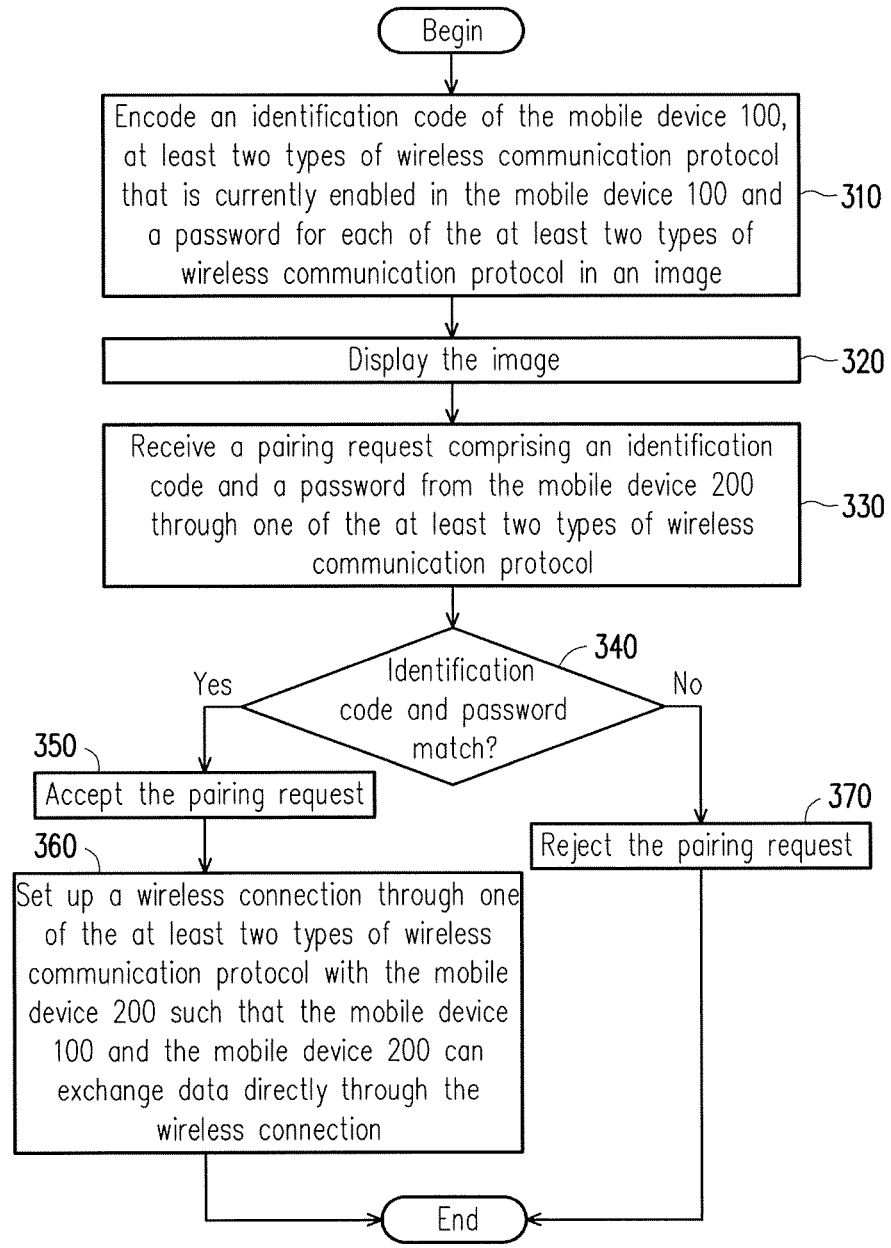
FIG. 3 and FIG. 4 are flow charts showing a wireless pairing method according to an embodiment of the present invention.

FIG. 3 is a flow chart showing a wireless pairing method executed by the processor 130 of the mobile device 100 according to an embodiment of the present invention. In step 310, the processor 130 encodes an identification code of the mobile device 100, at least two types of wireless communication protocol that is currently enabled in the mobile device 100 and a password for each of the least two types of wireless communication protocol stored in the storage device 110 in an image. In step 320, the processor 130 controls the display 120 to display the image. The password encoded in the image is the password that the mobile device 100 assigns to the mobile device 200. The mobile device 100 uses the image to notify the mobile device 200 of the identification code and the password. The image may be any digital image that can be encoded and decoded, such as barcode, including one-dimensional barcode, two-dimensional barcode, and Quick Response Code (QR Code). For security reasons, it is preferable that the information encoded in the image is not easily recognizable by human eyes. The mobile device 200 may take and decode the displayed image to obtain the identification code and the password to request a pairing connection with the mobile device 100.

In step 330, the processor 130 receives a pairing request including an identification code and a password from the mobile device 200 through one of the at least two types of wireless communication protocol. In step 340, the processor 130 checks whether the identification code of the pairing request matches the identification code of the mobile device 100 and the password of the pairing request matches any password stored in the storage device 110 or not. The processor 130 accepts the pairing request in step 350 when the identification code of the pairing request matches the identification code of the mobile device 100 and the password of the pairing request matches any password stored in the storage device 110. Next, the processor 130 sets up a wireless connection through one of the at least two types of wireless communication protocol with the mobile device 200 to pair with the mobile device 200 such that the mobile device 100 and the mobile device 200 can exchange data directly through the wireless connection in step 360. On the other hand, the processor 130 rejects the pairing request in step 370 when the identification code of the pairing request does not match the identification code of the mobile device 100 or the password of the pairing request does not match any password stored in the storage device 110.

Figure 4:
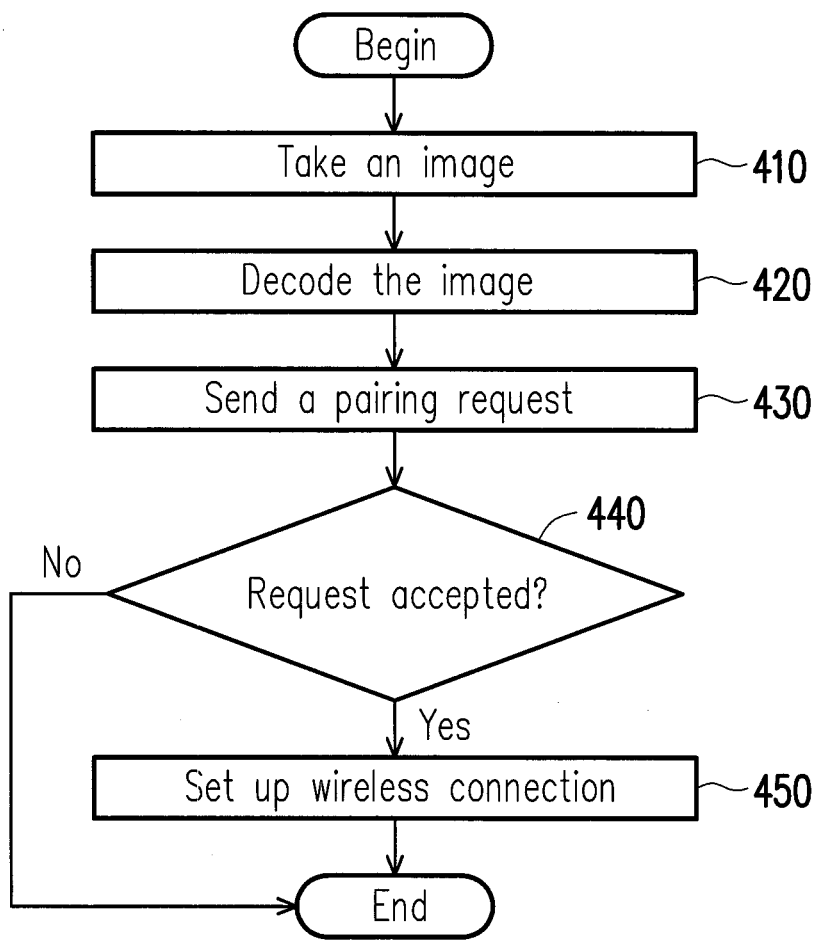

FIG. 4 is a flow chart showing a wireless pairing method executed by the processor 220 of the mobile device 200 according to an embodiment of the present invention. In step 410, the processor 220 controls the image sensor 210 to take the image displayed by the mobile device 100. In step 420, the processor 220 decodes the image to obtain an identification code of the mobile device 100 and a password. In step 430, the processor 220 sends a pairing request including the identification code and the password to the mobile device 100. In step 440, the processor 220 checks whether the mobile device 100 accepts the pairing request or not. After the mobile device 100 accepts the pairing request, the processor 220 sets up a wireless connection to pair with the mobile device 100 in step 450. The pairing of the mobile devices 100 and 200 may be used for various applications.

For example, the mobile device 200 may request to pair with the mobile device 100 to use the Wi-Fi hotspot function provided by the mobile device 100. In this case, the identification code encoded in the image displayed by the display 120 is the SSID of the wireless network started by the mobile device 100. After the processor 130 accepts the pairing request, the processors 130 and 220 may set up a wireless connection between the mobile devices 100 and 200 in steps 360 and 450 such that the mobile device 200 can access the wireless network through the wireless connection and the mobile device 100.

For another example, the mobile device 200 may request to pair with the mobile device 100 to exchange data (such as file transmission) with the mobile device 100 directly without a wireless network. The mobile devices 100 and 200 may perform such a pairing through a wireless communication protocol such as Wi-Fi Direct or Bluetooth. In this case, the identification code encoded in the image displayed by the display 120 is a device name or a media access control address (MAC address) of the mobile device 100. After the processor 130 accepts the pairing request, the processors 130 and 220 may set up a wireless connection between the mobile devices 100 and 200 in steps 360 and 450 such that the mobile devices 100 and 200 can exchange data directly through the wireless connection.

The processor 130 of the mobile device 100 may check the passwords stored in the storage device 110 periodically. When a password stored in the storage device 110 is associated with an access period and the access period expires, the processor 130 deletes the password from the storage device 110.

On the other hand, when a password stored in the storage device 110 is associated with an access count and the password is included in the pairing request accepted in step 350, the processor 130 decreases the access count associated with the password by one after the wireless connection between the mobile devices 100 and 200 is closed. When the access count associated with the password of the accepted pairing request is decreased to a preset value (such as zero), that means the access count expires and the processor 130 deletes the password of the accepted pairing request from the storage device 110.

Therefore, the passwords stored in the storage device 110 may be assigned with different access periods and access counts for security management. An access period defines the period of time in which the associated password can be used, while an access count defines the number of times for which the associated password can be used. When an access period or an access count expires, the associated password is deleted from the storage device 110 and the deleted password cannot be used again because any following pairing request including the deleted password will be rejected in step 370. On the other hand, a password stored in the storage device 110 may be assigned with an infinite access period or an infinite access count so that the access period or the access count never expires and the associated password can be used forever.

In an embodiment of the present invention, the pairing request does not have to include an identification code of the mobile device 100. In this embodiment, the processor 130 only encodes the password in the image in step 310. The processor 220 decodes the image to obtain the password in step 420. The pairing request includes the password only. The processor 130 accepts the pairing request in step 350 when the password of the pairing request matches any password stored in the storage device 110. The processor 130 rejects the pairing request in step 370 when the password of the pairing request does not match any password stored in the storage device 110.

In an embodiment of the present invention, in addition to the identification code and the password, the processor 130 may further encodes at least one type of wireless communication that is available in the mobile device 100 in the image displayed by the display 120, such as Wi-Fi Direct and Bluetooth. The mobile device 100 may support multiple types of wireless communication and each type may be enabled or disabled by the user. In this case, the processor 130 may encode the types of wireless communication that is currently enabled in the image. The processor 220 of the mobile device 200 may decode the image to obtain the one or more types of wireless communication that is currently available in the mobile device 100. The processor 220 may send the pairing request to the mobile device 100 through one of the one or more available types of wireless communication.

In summary, the mobile device provided by the present invention can encode the information required for a pairing connection in an image and display the image so that another mobile device can simply take and decode the displayed image to obtain the required information. This mechanism is very convenient and efficient because the user of the latter mobile device does not have to input the information manually. Moreover, the passwords for the pairing connection may be assigned with different access periods and access counts for flexible security management.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A first mobile device, comprising:
   a storage device storing at least one password, wherein each said password is associated with an access period or an access count;
   a display; and
   a processor coupled to the storage device and the display, deleting a said password when the access period or the access count associated with the password expires, encoding at least two types of wireless communication protocol that is currently enabled in the first mobile device and a said password for each of the at least two types of wireless communication protocol in an image and controlling the display to display the image, receiving a pairing request comprising a password from a second mobile device through one of the at least two types of wireless communication protocol, accepting the pairing request when the password of the pairing request matches any said password stored in the storage device, and rejecting the pairing request when the password of the pairing request does not match any said password stored in the storage device,
   wherein the processor further encodes an identification code of the first mobile device in the image and the pairing request further comprises an identification code,
   wherein the processor accepts the pairing request when the identification code of the pairing request matches the identification code of the first mobile device and the password of the pairing request matches any said password stored in the storage device, and wherein the processor rejects the pairing request when the identification code of the pairing request does not match the identification code of the first mobile device, and
   wherein after accepting the pairing request, the processor sets up a wireless connection through one of the at least two types of wireless communication protocol with the second mobile device such that the first mobile device and the second mobile device can exchange data directly through the wireless connection.

2. The first mobile device of claim 1, wherein the processor decreases the access count associated with the password of the accepted pairing request by one, and wherein the processor deletes the password of the accepted pairing request from the storage device when the associated access count is decreased to a preset value.

3. The first mobile device of claim 1, wherein the image is a barcode.

4. The first mobile device of claim 1, wherein after accepting the pairing request, the processor sets up a wireless connection through one of the at least two types of wireless communication protocol with the second mobile device such that the second mobile device can access a wireless network through the wireless connection and the first mobile device.

5. A first mobile device, comprising:
   an image sensor; and
   a processor coupled to the image sensor, controlling the image sensor to take an image displayed by a second mobile device, decoding the image to obtain at least two types of wireless communication protocol that is currently enabled in the second mobile device and a password for each of the at least two types of wireless communication protocol, and sending a pairing request to the second mobile device through one of the at least two types of wireless communication protocol, wherein each said password is associated with an access period or an access count and the pairing request comprises the password for the one of the at least two types of wireless communication protocol,
   wherein the second mobile device further encodes an identification code of the second mobile device in the image and the pairing request further comprises an identification code, wherein the second mobile device accepts the pairing request when the identification code of the pairing request matches the identification code of the second mobile device and the password of the pairing request matches any said password stored in the second mobile device, and wherein the second mobile device rejects the pairing request when the identification code of the pairing request does not match the identification code of the second mobile device, and
   wherein after accepting the pairing request, the second mobile device sets up a wireless connection through one of the at least two types of wireless communication protocol with the first mobile device such that the second mobile device and the first mobile device can exchange data directly through the wireless connection.

6. The first mobile device of claim 5, wherein the processor further decodes the image to obtain an identification code of the second mobile device and the pairing request further comprises the identification code.

7. A wireless pairing method, executed by a first mobile device, comprising:
   storing at least one password in the first mobile device, wherein each said password is associated with an access period or an access count;
   deleting a said password when the access period or the access count associated with the password expires;
   encoding at least two types of wireless communication protocol that is currently enabled in the first mobile device and a said password for each of the at least two types of wireless communication protocol in an image and displaying the image;
   receiving a pairing request comprising a password from a second mobile device through one of the at least two types of wireless communication protocol;
   accepting the pairing request when the password of the pairing request matches any said password stored in the first mobile device;

rejecting the pairing request when the password of the pairing request does not match any said password stored in the first mobile device;

encoding an identification code of the first mobile device in the image, wherein the pairing request further comprises an identification code;

accepting the pairing request when the identification code of the pairing request matches the identification code of the first mobile device and the password of the pairing request matches any said password stored in the first mobile device; and rejecting the pairing request when the identification code of the pairing request does not match the identification code of the first mobile device, and wherein after accepting the pairing request, the first mobile device sets up a wireless connection through one of the at least two types of wireless communication protocol with the second mobile device such that the first mobile device and the second mobile device can exchange data directly through the wireless connection.

8. The wireless pairing method of claim 7, further comprising:

decreasing the access count associated with the password of the accepted pairing request by one; and deleting the password of the accepted pairing request from the first mobile device when the associated access count is decreased to a preset value.

9. A wireless pairing method, executed by a first mobile device, comprising:

taking an image displayed by a second mobile device;

decoding the image to obtain at least two types of wireless communication protocol that is currently enabled in the second mobile device and a password for each of the at least two types of wireless communication protocol, wherein each said password is associated with an access period or an access count; and sending a pairing request to the second mobile device through one of the at least two types of wireless communication protocol, wherein the pairing request comprises the password for the one of the at least two types of wireless communication protocol, wherein the second mobile device further encodes an identification code of the second mobile device in the image and the pairing request further comprises an identification code, wherein the second mobile device accepts the pairing request when the identification code of the pairing request matches the identification code of the second mobile device and the password of the pairing request matches any said password stored in the second mobile device, and wherein the second mobile device rejects the pairing request when the identification code of the pairing request does not match the identification code of the second mobile device, and wherein after accepting the pairing request, the second mobile device sets up a wireless connection through one of the at least two types of wireless communication protocol with the first mobile device such that the second mobile device and the first mobile device can exchange data directly through the wireless connection.

10. The wireless pairing method of claim 9, further comprising:

decoding the image to obtain an identification code of the second mobile device, wherein the pairing request further comprises the identification code.

* * * * *